US006433119B1

(12) United States Patent
Smith

(10) Patent No.: US 6,433,119 B1
(45) Date of Patent: Aug. 13, 2002

(54) POLYMETALLIC CATALYSTS, METHOD OF PREPARING AND POLYMERS PRODUCED THEREBY

(75) Inventor: Crystal A. Smith, Delaware County, PA (US)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 09/499,844

(22) Filed: Feb. 7, 2000

Related U.S. Application Data

(62) Division of application No. 08/053,965, filed on Apr. 27, 1993, now Pat. No. 6,054,406, which is a continuation of application No. 07/423,293, filed on Oct. 18, 1989, now abandoned.

(51) Int. Cl.[7] ............................. C08F 10/14; C08F 4/646
(52) U.S. Cl. ................. 526/348.3; 526/114; 526/124.3; 526/308; 526/348; 526/348.2
(58) Field of Search ............................. 526/114, 124.2, 526/348, 348.3, 308, 124.3, 348.2

(56) References Cited

U.S. PATENT DOCUMENTS

| | | | |
|---|---|---|---|
| 3,642,746 A | 2/1972 | Kashiwa et al. ........... 260/88.2 |
| 4,076,922 A | 2/1978 | Satoh et al. ................. 526/97 |
| 4,310,648 A | 1/1982 | Shipley et al. ............... 526/114 |
| 4,321,345 A | 3/1982 | Sato et al. .................. 526/115 |
| 4,335,225 A | 6/1982 | Collette et al. ............. 525/248 |
| 4,356,111 A | 10/1982 | Shipley et al. .......... 252/429 B |
| 4,363,902 A | 12/1982 | Kurz ........................ 526/114 |
| 4,392,983 A | 7/1983 | Hartshorn et al. ....... 252/429 B |
| 4,472,315 A | 9/1984 | Albizzati et al. ......... 260/429 R |
| 4,472,524 A | 9/1984 | Albizzati .................... 502/113 |
| 4,506,027 A | 3/1985 | Invernizzi et al. ............. 502/9 |
| 4,518,751 A | 5/1985 | Mizogami et al. .......... 526/114 |
| 4,554,265 A | 11/1985 | Graves ....................... 502/113 |
| 4,562,170 A | 12/1985 | Graves ....................... 502/113 |
| 4,578,373 A | 3/1986 | Graves ....................... 502/113 |
| 4,618,660 A | 10/1986 | Graves ....................... 526/114 |
| 4,665,262 A | 5/1987 | Graves ....................... 585/512 |

FOREIGN PATENT DOCUMENTS

| | | | |
|---|---|---|---|
| EP | 273208 | 7/1988 | ................. 526/114 |
| EP | 294168 | 12/1988 | |
| JP | 1-236203 | 9/1989 | |

OTHER PUBLICATIONS

Boor, Ziegler–Natta Catalysts and Polymerization, Academic Press, NY (1979) pp. 602–609.

Primary Examiner—Fred Teskin

(57) ABSTRACT

Disclosed is a polymetallic supported catalyst component comprising an activated anhydrous $MgCl_2$ solid support which has been treated with at least one treatment of at least two halogen-containing transition metal compounds, wherein one is a halogen-containing titanium metal compound and one is a halogen-containing non-titanium transition metal compound, optionally, in the presence of an electron donor and the processes for producing the component. A catalyst for the polymerization of at least one alpha-olefin of the formula $CH_2=CHR$, where R is H or a $C_{1-12}$ branched or straight chain alkyl or substituted or unsubstituted cycloalkyl, by reacting this supported catalyst component with an organometallic cocatalyst, optionally in the presence of an electron donor, and the polymerization of at least one alpha-olefin with the catalyst are also disclosed. The resulting polymers, particularly propylene polymers, have a controllable atactic content, which is expressed herein in terms of its xylene solubility at room temperature (XSRT), wherein the ratio of the I.V. of the XSRT fraction to the I.V. of the bulk polymer is greater than or equal to 0.50.

2 Claims, No Drawings

POLYMETALLIC CATALYSTS, METHOD OF PREPARING AND POLYMERS PRODUCED THEREBY

CROSS-REFERENCE TO RELATED APPLICATIONS

This application is a divisional application of U.S. application Ser. No. 08/053,965, filed on Apr. 27, 1993, which issued on Apr. 25, 2000, as U.S. Pat. No. 6,054,406, and which is a continuation of U.S. application Ser. No. 07/423,293, filed on Oct. 18, 1989, now abandoned. The entire contents of U.S. Pat. No. 6,054,406, and U.S. application Ser. Nos. 08/053,965 and 07/423,293, each as filed, are incorporated herein by reference.

FIELD OF THE INVENTION

This invention relates to a polymetallic supported catalyst component, to a method of preparing the polymetallic supported catalyst component, to the Ziegler-Natta catalyst prepared from the component, to a method of polymerizing at least one alpha-olefin of the formula $CH_2$=CHR where R is H or a $C_{1-12}$ branched or straight chain alkyl or unsubstituted or substituted cycloalkyl and to the olefin polymers produced using the catalyst.

BACKGROUND OF THE INVENTION

The polymerization of alpha olefins, particularly propylene, with Ziegler-Natta catalysts, comprising the reaction products of organometallic compounds with transition metal compounds, to produce highly crystalline isotactic polymers is known. Typically the highly crystalline isotactic fraction was separated from the amorphous and low molecular weight and semi-crystalline fractions by extraction with a hydrocarbon solvent, such as hexane or kerosene. Since the advent of these catalysts, research activity in this area has generally been concerned with improving the yield, stereospecificity and morphology of the crystalline isotactic polymers. This was achieved with the development of a highly active and highly stereospecific catalyst system comprising $TiCl_4$ and an electron donor compound (Lewis base) supported on an activated anhydrous $MgCl_2$ solid catalyst component, and an organoaluminum activator as cocatalyst, with or without an electron donor compound. Typically, the propylene homopolymers produced with this catalyst have an isotacticity of greater than 95% as determined by the number fraction of isotactic pentads from $^{13}C$ NMR analysis and a % XSRT of 2 to 5 wherein the ratio of the I.V. of the XSRT fraction to the I.V. of the whole polymer is less than 0.50. Despite the flexibility of this catalyst system, it does not provide certain soft resins having elastic properties or allow production of an atactic polymer of high molecular weight.

U.S. Pat. No. 4,562,170 describes a supported catalyst component for the polymerization of alpha olefins, particularly ethylene, which requires a metal oxide support material from the metals of Groups 2a, 3a, 4 and 4 of the Periodic Table. The supported component is prepared under anhydrous conditions by the sequential steps of forming a slurry of the metal oxide, preferably dehydrated high surface area silica, adding a solution of an organomagnesium compound, adding and reacting a solution of a hafnium compound, adding and reacting a halogenator, adding and reacting a tetravalent titanium compound and recovering the solid catalyst component. It is used with an organoaluminum cocatalyst in the polymerization of ethylene. A similar catalyst system is described in U.S. Pat. Nos. 4,554,265 and 4,618,660 except that the organomagnesium compound in a solution is first reacted with a zirconium compound in a solution rather than a hafnium compound.

U.S. Pat. Nos. 4,578,373 and 4,665,262 relate to supported catalyst component which is quite similar to those described in U.S. Pat. Nos. 4,562,170, 4,554,265 and 4,618,660 discussed above. The primary difference appears to be that a solution of a zirconium compound, hafnium compound or mixtures thereof is used instead of the solution of a hafnium compound or a solution of a zirconium compound.

U.S. Pat. Nos. 4,310,648 and 4,356,111 disclose an olefin polymerization catalyst component prepared by reacting a trivalent or tetravalent titanium compound, a zirconium compound, and organomagnesium compound and a halogen source, such a ethylaluminum dichloride.

SUMMARY OF THE INVENTION

The present invention, in one embodiment, provides a polymetallic supported catalyst component comprising an activated anhydrous $MgCl_2$, or alcohol adduct thereof, solid support which has been treated with at least one treatment of at least two halogen-containing transition metal compounds, wherein one is a halogen-containing titanium metal compound and one is a halogen-containing non-titanium transition metal compound, optionally, in the presence of an electron donor.

Another aspect of this invention is the process for producing the polymetallic supported catalyst component comprising treating the activated anhydrous $MgCl_2$, alcohol adduct thereof or precursor thereof with at least two treatments of at least two halogen-containing transition metal compounds, one of which is a halogen-containing titanium compound and one of which is a halogen-containing non-titanium transition metal compound, sequentially or simultaneously, optionally, in the presence of a polar, substantially inert solvent in which the metal compounds are at least sparingly soluble and the support is substantially insoluble, and optionally in the presence of an electron donor, initially at 0° C. and then at a temperature from about 30° to about 120° C. for a period of time from 30 to 240 minutes for each treatment, with the solids being isolated in between treatments.

In another embodiment of the invention, a catalyst for the polymerization of at least one alpha-olefin of the formula $CH_2$=CHR, where R is H or a $C_{1-12}$ branched or straight chain alkyl or substituted or unsubstituted cycloalkyl, is provided by reacting the aforementioned supported catalyst component with an organometallic cocatalyst, optionally in the presence of an electron donor. When substituted, the cycloalkyl is preferably substituted in the 4 position. Typical substituent groups are $C_{1-13}$ alkyl or halide or both.

Another aspect of this invention is the polymerization of at least one alpha-olefin having the above formula with the catalyst of this invention.

In yet another embodiment, this invention provides polymers, especially propylene polymers, which have a controllable atactic content, which is expressed herein in terms of its xylene solubility at room temperature (XSRT), and exhibit a ratio of the IV of the xylene soluble fraction to the IV of the bulk polymer greater than or equal to 0.50.

DETAILED DESCRIPTION OF THE INVENTION

The activated anhydrous $MgCl_2$ support can be prepared by any of the methods disclosed in U.S. Pat. Nos. 4,544,717, 4,294,721, and 4,220,554, the methods of which are incorporated herein by reference.

Alternatively, the solid catalyst support may be prepared by forming an adduct of magnesium dichloride and an alcohol, such as ethanol, propanol, butanol, isobutanol and 2-ethylhexanol, wherein the molar ratio is 1:1 to 1:3, which then treated further according to this invention.

In another method, a magnesium dichloride/alcohol adduct containing generally 3 moles of alcohol per mole of $MgCl_2$, may be prepared by mixing the alcohol with the magnesium chloride in an inert hydrocarbon liquid immiscible with the adduct, heating the mixture to the fusion temperature of the adduct while stirring vigorously at 2000–5000 rpm using, for example, an Ultra Turrax T-45 N stirrer. The emulsion thus obtained is cooled quickly to cause the adduct to solidify into spherical particles. The adduct particles are dried and partially dealcoholated under an inert atmosphere, such as nitrogen, by gradually increasing the temperature from 50° C. to 130° C. for a period of time sufficient to reduce the alcohol content from 3 moles to 1–1.5 moles per mole of $MgCl_2$. The resulting partically dealcoholated adduct is in the form of spherical particles having an average diameter of 50 to 350 microns, a surface area, by B.E.T. using a Sorptomatic 1800 apparatus, of about 9 to 50 $m^2/g$ and a porosity, as determined with a mercury porosimeter, of 0.6 to 2 cc/g. For example, a $MgCl_2 \cdot 3$ ROH adduct, where R is a straight or branched $C_{2-10}$ alkyl, can be prepared according to the ingredients and procedure of example 2 of U.S. Pat. No. 4,399,054, the method of which is incorporated herein by reference, except that the stirring is done at 3,000 rpm instead of 10,000 rpm. The adduct particles thus formed are recovered by filtering, are washed 3 times at room temperature with 500 ml aliquots of anhydrous hexane and gradually heated by increasing the temperature from 50° C. to 130° C. under nitrogen for a period of time sufficient to reduce the alcohol content from 3 moles to about 1.5 moles per mole of $MgCl_2$.

The activated $MgCl_2$ may be activated prior to the treatment with the halogen-containing transition metal compounds or formed in situ from a precursor of the $MgCl_2$ under conditions which form and activate the magnesium dichloride. One such condition is the reaction of a halogen-containing titanium compound, such as titanium tetrachloride, with a Mg compound, such as $Mg(OEt)_2$, at 30° to 120° C. with agitation, generally about 250 rpm. The crux is the use of an activated $MgCl_2$, not the means for obtaining same.

The solid catalyst supported component is formed by treating an anhydrous activated $MgCl_2$, an alcohol adduct thereof or an unactivated precursor thereof, in an inert atmosphere, with at least one treatment of at least two halogen-containing transition metal compounds, sequentially or simultaneously or both, wherein one is a halogen-containing titanium compound and one is a halogen-containing non-titanium transition metal compound, optionally, in the presence of a polar liquid medium, initially at 0° C. and then at a temperature from 30° to 120° C. for 30 to 240 minutes, with the solids being isolated in between treatments. The order of treatment with and the relative amounts of the halogen-containing transition metal compounds are used to affect catalyst activity and polymer properties. It is preferred to treat the support with a halogen-containing titanium compound or a combination of a halogen-containing titanium compound and at least one halogen-containing non-titanium transition metal compound first. To obtain a predominantly atactic polymer, i.e., one with a high xylene soluble fraction, it preferred to use a combination of the two compounds in the first treatment. The preferred combination is a halogen-containing titanium compound with a halogen-containing zirconium compound or a halogen-containing hafnium compound. To obtain a predominantly isotactic polymer, i.e. one with a low xylene soluble fraction, it is preferred to treat the support first with a halogen-containing titanium compound in the presence of an electron donor. After the first treatment, the solids are separated and treated one or more times again with various combinations of halogen-containing transition metal compounds with the solids being isolated between treatments.

Any polar liquid medium in which the halogen-containing transition metal compounds are at least sparingly soluble and the solid activated anhydrous $MgCl_2$ support is substantially insoluble, and which is substantially inert with respect to the various components of the supported catalyst component, although it may interact, may be used.

Such solid catalyst component when prepared from anhydrous activated $MgCl_2$ or an unactivated precursor thereof which has been activated show an X-ray spectrum in which the most intense diffraction line which appears in the spectrum of unactivated magnesium dichloride (with a surface area of less than 3 $m^2/g$) is absent, and in its place a broadened halo appears with its maximum intensity shifted with respect to the position of the most intense line of unactivated spectrum, or the most intense diffraction line has a half peak breadth at least 30% greater than that of the most intense diffraction line characteristic of the X-ray spectrum of unactivated magnesium dichloride.

When prepared from a $MgCl_2 \cdot 3$ ROH adduct which has been dealcoholated as described above, the solid catalyst component prepared therefrom has an X-ray spectrum where the Mg chloride refections appear, which shows a halo with maximum intensity between angles of $2\ominus$ of 33.5° and 35°, and where the reflection at $2\ominus$ of 14.95° is absent. The symbol $2\ominus$=Bragg angle.

Suitable halogen-containing transition metal compounds useful in the preparation of the polymetallic catalyst supported component of this invention include the halides, oxyhalides, alkoxyhalides, hydridohalides and alkylhalides of Sc, Ti, Zr, Hf, V, Nb and Ta. The halide may be chlorine or bromine. The alkoxyhalides and alkylhalides typically have 1–12 carbon atoms and are both straight and branched. The chlorides of Ti, Zr and Hf are preferred.

Scandium trichloride and scandium tribromide are typical scandium compounds useful in the preparation of the supported component of this invention. Scandium trichloride is preferred.

Examples of suitable titanium compounds include titanium tetrachloride, titanium tetrabromide, titanium oxychloride, titanium oxybromide and trichlorotitanium ethoxide. Titanium tetrachloride is preferred.

Suitable zirconium compounds include zirconium tetrachloride, zirconium tetrabromide, zirconyl bromide and zirconyl chloride. Zirconium tetrachloride is preferred.

Typical hafnium compounds include hafnium tetrachloride, hafnium tetrabromide, hafnium oxybromide and hafnium oxychloride. The preferred hafnium compound is hafnium tetrachloride.

Examples of suitable vanadium compounds include vanadium tetrachloride, vanadium tetrabromide, vanadyl chloride and vanadyl bromide. Vanadyl chloride is preferred.

Suitable niobium compounds include niobium pentachloride, niobium pentabromide, niobium oxychloride and niobium oxybromide. The preferred niobium compound is niobium pentachloride.

Typical tantalum compounds useful in the practice of this invention include tantalum pentachloride and tantalum pentabromide. Tantalum pentachloride is preferred.

The quantity of the transition metal compounds used in preparing the solid supported catalyst component of this invention is from 5 to 100 moles per mole of the $MgCl_2$, preferably from 10 to 50 moles, most preferable from 10 to 25 moles. The ratio of Ti metal to the other transition metal or transition metals, as the case may be, is typically from 10:1 to 4000:1, preferably 250:1 to 25:1.

The transition metal compounds can be used neat (undiluted) or in a substantially inert polar liquid medium. A preactivated anhydrous $MgCl_2$, or a Mg compound capable of forming $MgCl_2$ which is then activated when treated with the halogen-containing titanium metal compound, at a temperature from 30° to 120° C., can be used.

Typically, the reaction ingredients are stirred at about 250 to 300 rpm in a 1 liter vessel. The reaction is generally carried out over a period of time from about 30 to about 240 minutes, preferably from 60 to 180 minutes, most preferably 80 to 100 minutes, per each treatment.

Typical polar liquid mediums useful in the preparation of the supported catalyst component include acetonitrile, methylene chloride, chlorobenzene, 1,2-dichloroethane and mixtures of chloroform and hydrocarbon solvents. Methylene chloride and 1,2-dichloroethane are the preferred polar liquid media. When a mixture of chloroform and hydrocarbon material is used, the suitable hydrocarbon materials include kerosene, n-pentane, isopentane, n-hexane, isohexane and n-heptane. Normal hexane is the preferred hydrocarbon material.

Suitable election donors for use in the preparation of the supported catalyst component of this invention include acid amides, acid anhydrides, ketones, aldehydes and monofunctional and difunctional organic acid esters having from 2 to 15 carbon atoms, such as methyl acetate, ethyl acetate, vinyl acetate, cyclohexyl acetate, ethyl propionate, methyl butyrate, ethyl valerate, methyl benzoate, ethylbenzoate, butyl benzoate, phenyl benzoate, methyl toluate, ethyl toluate, amyl toluate, methyl anisate, ethylethoxybenzoate, ethyl pivalate, ethyl naphthoate, dimethyl phthalate, diethyl phthalate and diisobutyl phthalate (DIBP). In addition, 1,3- and 1,4- and 1,5- and greater diethers, which may be substituted on all carbons, and, preferably, have substitutions on at least one of the internal carbons may be used. Suitable diethers include 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2,3-diphenyl-1,4-diethoxybutane, 2,3-dicyclohexyl-1,4-diethoxybutane, 2,3-dicyclohexyl-1,4-dimethoxybutane, 2,3-bis(p-fluorophenyl)-1,4-dimethoxybutane, 2,4-diphenyl-1,5-dimethoxypentane, and 2,4-diisopropyl-1,5-dimethoxypentane. Difunctional esters, such as diisobutyl phthalate are preferred.

The supported catalyst component prepared according to this invention is recovered and washed with several, e.g. approx. 5–20, aliquots of a substantially inert solvent. Suitable solvents for washing the catalyst component include methylene chloride, 1,2-dichloroethane, hexane and chloroform/hexane mixtures wherein the amount of chloroform can be from 10% to 75% of the mixture.

The catalyst component may be stored dry or as a slurry in a suitable nonreactive atmosphere, i.e., under an inert atmosphere without exposure to heat or light, either artificial or natural, for at least 6 months up to several years.

Organometallic compounds suitable for use in the preparation of the catalyst of this invention include organoaluminum compounds, organogallium compounds, organotransition metal compounds, organomagnesium compounds and organozinc compounds. In general, alkylaluminum compounds are preferred.

Triisobutylaluminum (TIBAL), diisobutylaluminum hydride (DIBAL-H), diisobutylaluminum ethoxide, triethylgallium, triethyl aluminum (TEAL), triisopropylaluminum, diisobutyl zinc, diethylzinc, dialkyl magnesium, such as dimethylmagnesium and diethylmagnesium, and compounds containing two or more Al atoms linked to each other through hetero-atoms, such as:

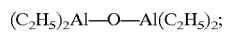

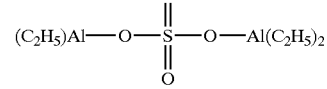

are typical metal alkyl compounds. Generally from about 5 to about 20 mmoles of organometallic activator per 0.005 to 0.05 g of supported catalyst component is used.

Suitable electron donors for use with the organometallic compounds are organosilane compounds having silicon (IV) as the central atom with at least two alkoxy groups bonded thereto and a —OCOR, —NR$_2$ or —R group or two of these groups which may be the same or different bonded thereto, where R is an alkyl, alkenyl, aryl, arylalkyl or cycloalkyl with 1–20 carbon atoms. Such compounds are described in U.S. Pat. Nos. 4,472,524, 4,522,930, 4,560,671, 4,581,342 and 4,657,882. In addition, organosilane compounds containing a Si—N bond, wherein the nitrogen is part of a 5–8 membered heterocyclic ring can be used. Examples of such organosilane compounds are diphenyldimethoxysilane (DPMS), dimesityldimethoxysilane (DMMS), t-butyl(4-methyl)piperidyldimethoxysilane (TB4MS), t-butyl(2-methyl)piperidyldimethoxysilane, isobutyl(4-methyl) piperidyldimethoxysilane, dicyclohexyldimethoxysilane, t-butyltriethoxysilane and cyclohexyltriethoxysilane. Dimesityldimethoxysilane and t-butyl-(4-methyl) piperidyldimethoxysilane are preferred. A method of preparing TB4MS is disclosed in U.S. Ser. No. 386,183, filed Jul. 26, 1989 and the disclosure of this method is incorporated herein by reference. The remaining silanes are commercially available.

In the catalysts of this invention the ratio of Mg:Me is from about 0.9 to about 25.0, the ratio of M':Ti is from about 0.1 to 25.0, the ratio of Al:Me is about 20 to about 40,000. Me is Ti, Sc, Zr, Hf, V, Nb, Ta or combinations thereof. M' is Sc, Zr, Hf, V, Nb, Ta or combinations thereof.

Alpha olefins which can be polymerized by the catalyst of this invention include ethylene, propylene, 1-butene, 1-pentene, 4-methyl-1-pentene, 1-hexene, 1-octene, vinyl cyclohexane, allyl benzene, allyl cyclohexane, vinyl cyclopentane or mixtures thereof.

The polymerization reactions using the catalyst of this invention are carried out in an inert atmosphere in the presence of liquid or gaseous monomer or combinations thereof and, optionally, in the presence of an inert hydrocarbon solvent, at a temperature from about 30° to about 100° C., preferably from 50° to 80° C., and at a pressure from about atmospheric to about 1000 psi, preferably from about 200 to 500 psi in liquid phase polymerization and from atmospheric to about 600 psi in gas phase polymerization.

Typical residence times are from about 15 minutes to about 6 hours, preferably from 1 to 4 hours.

The catalyst system, i.e., the polymetallic supported component, the organometallic activator and the electron donor, when used, can be added to the polymerization reactor by separate means substantially simultaneously, regardless of whether the monomer is already in the reactor, or sequentially if the monomer is added to the polymerization reactor later. It is preferred to premix the supported catalyst component and the activator prior to the polymerization for from 3 minutes to about 10 minutes at ambient temperature.

The olefin monomer can be added prior to, with or after the addition of the catalyst system to the polymerization reactor. It is preferred to add it after the addition of the catalyst system.

Hydrogen can be added as needed as a chain transfer agent for reduction in the molecular weight of the polymer.

The polymerization reactions can be done in slurry, liquid or gas phase processes, or in a combination of liquid and gas phase processes using separate reactors, all of which can be done either by batch or continuously.

The catalysts may be precontacted with small quantities of olefin monomer (prepolymerization), maintaining the catalyst in suspension in a hydrocarbon solvent and polymerizing at a temperature of 60° C. or below for a time sufficient to produce a quantity of polymer from 0.5 to 3 times the weight of the catalyst.

This prepolymerization also can be done in liquid or gaseous monomer to produce, in this case, a quantity of polymer up to 1000 times the catalyst weight.

Analytical Methods

Unless otherwise specified, the following analytical methods were used to characterize the supported catalyst component samples and the polymer samples.

The concentration of active metals in the supported catalyst components were determined by atomic absorption spectrophotometry using a Perkin Elmer Model 3030. To analyze for Mg, Ti, Sc & V, the samples (0.07 g±0.01) were hydrolyzed with 25 ml of 2N $H_2SO_4$ solution containing 0.2% KCl by weight, in a sealed container under an inert gas. The samples were filtered, and aliquots were diluted as necessary based on metal concentration. The resultant aliquots were analyzed by flame AA using standard techniques as described in "Analytical Methods for Atomic Absorption Spectrophotometry", Perkin-Elmer Corp., Norwalk, Conn. The same procedure was used for Zr & Hf except that a 1% HF solution containing 0.2 wt % Al (added as $AlCl_3.6\ H_2O$) was used instead of the 2N $H_2SO_4$ solution.

The organic compounds in the supported catalyst component were determined by gas chromatography. The sample (0.5–1.0 g) was dissolved in 20 ml acetone and 10 ml of an internal standard solution of 0.058 to 0.060 molar n-dodecane in acetone was added. When the supported catalyst component contained an electron donor, di(n-butyl) phthalate was added to the internal standard solution in an amount such that a 0.035 to 0.037 molar di(n-butyl)phthalate solution is formed. Then 15% $NH_4OH$ was added dropwise until the solution was at pH 7 to precipitate the metals which were removed by filtration. The filtrate was analyzed by gas chromatography, using a HP-5880 gas chromatograph with FID (flame ionization detector). The column is a 0.530 mm ID fused silica wide-bore capillary column coated with Supelcowax 10.

The intrinsic viscosity of the resultant polymers was determined in decalin at 135° C. using a Ubbelohde type viscometer tube by the method of J. H. Elliott et al., J. Applied Polymer Sci. 14, 2947–2963 (1970).

The % xylene soluble fraction was determined by dissolving a 2 g sample in 200 ml xylene at 135° C., cooling in a constant temperature bath to 22° C. and filtering through fast filter paper. An aliquot of the filtrate was evaporated to dryness, the residue weighed and the weight % soluble fraction calculated.

The melting point and heat of fusion were determined by differential scanning calorimetry (DSC) using a DuPont 9900 controller with a DuPont 910 DSC cell. Melting data was obtained under a nitrogen atmosphere at a 20°/minute heating rate after quenching from the melt.

A Nicolet 360 spectrometer was used to determine the atactic, syndiotactic and isotactic content based on $^{13}C$ NMR pentad sequence analysis (of methyl resonances) described in J. C. Randall, "Polymer Sequence Determination" Academic Press, N.Y. (1977).

Tensile strength was determined according to the procedures of ASTM D412.

A Nicolet 740 SX FT-infrared spectrophotometer was used to quantify the monomers in copolymer samples.

The following examples illustrate the specific embodiments of the instant invention.

In the examples, dry and oxygen-free solvents were used. The solvents were dried by storing over activated molecular sieves or by distillation from $CaH_2$. The transition metal compounds were used as received from the manufacturer. The electron donors were dried over activated 4A molecular sieves, neat or as solutions in hexane, prior to use. All preparations of the solid supported catalyst component and polymerization reactions were carried out under an inert atmosphere.

All percentages are by weight unless otherwise indicated. Ambient or room temperature is approximately 25° C.

EXAMPLE 1

This example illustrates the supported catalyst component and a method of preparing same.

Into a reaction vessel fitted with a condenser, an adapter and a paddle stirrer, which had been sparged with nitrogen for approximately 15–20 minutes, was added 2.5 g (11 mmoles) $ZrCl_4$ slurried in 50 ml neat $TiCl_4$ (0.45 moles). The slurry was then cooled in a dry ice/isopar bath to 0° C. while stirring at 100 rpm. A preactivated anhydrous $MgCl_2$ support (5.1 g) containing 12.5% Mg and 50% ethanol was added to the reaction vessel under inert atmosphere. After the addition of the support was complete, the agitation rate was increased to 250 rpm, the dry ice/isopar bath was replaced with an oil bath and the reaction temperature was raised to 100° C. over one hour under a low nitrogen flow. The reaction mixture was maintained under those conditions for 90 minutes. At the end of this period, stirring was stopped and the solids were allowed to settle for approximately 20 minutes at 100° C. The supernatant liquid was removed and the solids were washed five times with 50 ml portions of methylene chloride at 30° C. The solids were then treated with 50 ml neat $TiCl_4$ (0.45 moles) while stirring at 250 rpm. The reaction mixture was then heated with the same amount of agitation to 100° C. over one hour under a low flow of nitrogen. The reaction conditions were maintained for 90 minutes. Agitation was then stopped and the solids were allowed to settle for approximately 20 minutes at 100° C. The supernatant was removed. The solids were washed three times at 60° C. and then three times at ambient temperature with 50 ml portions of hexane. The supported catalyst component, slurried in the final wash, was transferred into a Schlenk flask. The last wash was decanted and the catalyst dried under a reduced pressure of about 25 inches of vacuum, maintained by bleeding nitrogen into the vacuum manifold, at 50° C. shaking periodically until a free flowing powder was obtained. The catalyst component had 11.4% Mg, 2.3% Ti and 20.2% Zr on elemental analysis.

EXAMPLE 2

The procedure and ingredients of Example 1 were used except that 3.4 g (11 mmoles) $HfCl_4$ was used instead of $ZrCl_4$. The catalyst component had 10.7% Mg, 2.3% Ti and 25.2% Hf on elemental analysis.

EXAMPLE 3

The procedure and ingredients of Example 1 were used except that 1.6 g $ScCl_3$ (11 mmoles) was used instead of $ZrCl_4$. The catalyst component had 11.2% Mg, 6.5% Ti and 7.8% Sc on elemental analysis.

EXAMPLE 4

The procedure and ingredients of Example 1 were used except that 1.7 g $HfCl_4$ (5.3 mmoles) and 1.2 g $ZrCl_4$ (5.2 mmoles) were used instead of 2.5 g (11 mmoles) $ZrCl_4$. The catalyst component had 10.4% Mg, 2.5% Ti, 9.3% Zr and 15.4% Hf on elemental analysis.

EXAMPLE 5

Into a reaction vessel fitted with a condenser, an adapter and a paddle stirrer, which had been sparged with nitrogen for approximately 15–20 minutes, was added neat $TiCl_4$ (150 ml, 1.4 moles). The $TiCl_4$ was then cooled in a dry ice/isopar bath to 0° C. while stirring at 100 rpm. A preactivated anhydrous $MgCl_2$ support (15.0 g) containing 11.3% Mg and about 55% ethanol was added to the reaction vessel under inert atmosphere. After the addition of the support was complete, the agitation rate was increased to 250 rpm, the dry ice/isopar bath was replaced with an oil bath and the reaction temperature was raised to 100° C. over one hour under a low nitrogen flow. Neat diisobutylphthalate (DIBP) (3.6 ml, 14 mmoles) was added dropwise via a syringe when the temperature reached 50° C. The reaction mixture was maintained at 100° C. for 90 minutes. At the end of this period, stirring was stopped and the solids allowed to settle at 100° C. for about 20 min. The supernatant liquid was removed and a slurry of $ZrCl_4$ (3.0 g, 13 mmoles) in 1,2-dichloroethane (300 ml) was charged to the resultant solids. The reaction mixture was then heated to 60° C. over 30 minutes under a low flow of nitrogen while agitating at 250 rpm. The reaction conditions were maintained for 90 minutes. At the end of this period, stirring was again stopped and the solids were allowed to settle for approximately 20 minutes at 60° C. The supernatant liquid was removed and the solids were washed five times at 60° C. and three times at ambient temperature with 100 ml portions of 1,2-dichloroethane. The supported catalyst component was then washed twice at ambient temperature with 100 ml portions of hexane. The supported catalyst component, while slurried in the final wash, was transferred into a Schlenk flask. The last wash was decanted and the catalyst dried under a reduced pressure of 25 inches of vacuum at 50° C. shaking periodically until a free flowing powder was obtained. The catalyst component had 15.6% Mg, 1.3% Ti, 6.4% Zr and 6.9% DIBP on elemental analysis.

EXAMPLE 6

The procedure and ingredients of Example 5 were used except that methylene chloride was used in place of 1,2-dichloroethane and 40° C. was used instead of 60° C. The catalyst component had 16.4% Mg, 1.9% Ti, 4.6% Zr and 5.9% DIBP on elemental analysis.

EXAMPLE 7

The procedure and ingredients of Example 5 were used except that 14.8 g of a preactivated anhydrous $MgCl_2$ support was used instead of 15.0 g, and except that 7.2 ml (27 mmoles) DIBP was used instead of 3.6 ml DIBP. The catalyst component had 15.8% Mg, 2.5% Ti, 2.4% Zr and 8.3% DIBP on elemental analysis.

EXAMPLE 8

This example illustrates another supported catalyst component of this invention and method of making same.

Into a vessel, which had been sparged with argon for approximately 15–20 minutes, was added 5.2 g (22 mmoles) $ZrCl_4$. Then 50 ml (0.45 mmoles) neat $TiCl_4$ was added and the vessel was shaken or swirled intermittently until a slurry was formed (approx. 5–20 min.). The resultant mixture was transferred under a low argon flow at 2–5 psi into a reaction vessel fitted with a septum cap and stir paddle, which had been sparged with argon for 15–°minutes prior to the transfer. The slurry was then cooled in a dry ice/isopar bath to 0° C. while stirring at 200 rpm. A preactivated anhydrous $MgCl_2$ support (5.6 g) containing 11.3% Mg and about 55% ethanol was added to the reaction vessel under inert atmosphere. After the addition of the support was complete, the septum cap was replaced with a ground glass stopper, the stirrer speed was increased to 300 rpm and the dry ice/isopar bath was replaced with an oil bath. The reaction mixture was heated to 100° C. over one hour and then maintained at that temperature for 3 hours. At the end of this period, stirring was stopped and the solids were allowed to settle for approximately 20 minutes at 100° C. The supernatant liquid was removed and 200 ml anhydrous hexane was added. The mixture was then heated to 60° C. with the stirrer speed at 300 rpm for 10 minutes. Agitation was then stopped and the solids were allowed to settle for about 5 minutes at 60° C. The supernatant was removed. The solids were washed four more times in the same manner by adding 200 ml hexane, heating to 60° C. with stirring at 300 rpm for 10 minutes, stopping the agitation, allowing the solids to settle for about 5 minutes at 60° C. and removing the supernatant. The solids were then washed five more times in the same manner at ambient temperature. The resultant supported catalyst component was then suspended in 150 ml hexane and transferred under an argon flow into another reaction vessel. The hexane was removed after the solids were allowed to settle for approximately 30 minutes at ambient temperature. The catalyst component was dried at 50° C. under reduced pressure of about 20 inches of vacuum, maintained by bleeding argon into the vacuum manifold, until essentially all free solvent had disappeared. The pressure was then decreased to about 25 inches of vacuum and the catalyst component was shaken periodically until a free flowing powder was obtained. The catalyst component had 6.0% Mg, 5.5% Ti, 25.9% Zr and 54.1% Cl on elemental analysis.

EXAMPLE 9

The procedure and ingredients of example 8 were used except that 5.0 g (22 mmoles) $ZrCl_4$ and 4.9 g preactivated support were used, and the resultant catalyst component was washed five times with 50 ml of anhydrous methylene chloride at 30° C. with stirring at 300 rpm for 10 minutes and resuspended in 50 ml of anhydrous methylene chloride. This catalyst component had 6.7% Mg, 6.1% Ti, 20.2% Zr and 54.8% Cl on elemental analysis.

EXAMPLE 10

The procedure and ingredients of example 8 were used except that 2.5 g (11 mmoles) $ZrCl_4$ and 5.0 g preactivated support were used and except that the catalyst component was washed according to the procedure of example 9. The analysis showed that the catalyst component contained 10.1% Mg, 5.0% Ti, 15.6% Zr and 56.4% Cl.

EXAMPLE 11

The procedure and ingredients of Example 8 were used except that 1.0 g (4.3 mmoles) $ZrCl_4$ was used instead of 5.2 g, 5.0 g of preactivated anhydrous $MgCl_2$ support was used instead of 5.6 g, the reaction conditions were maintained for 90 minutes rather than 3 hours, 50 ml portions of methylene chloride was used to wash instead of 200 ml portions of anhydrous hexane, a wash temperature of 30° C. was used instead of 60° C., and after the last wash at 60° C. in Example 8, but prior to the transfer to another reaction vessel for drying, the following procedure and ingredients were used.

A slurry of 1.0 g $ZrCl_4$ and 50 ml neat $TiCl_4$ was added to the resulting solids after the last wash and the reaction mixture was heated to 100° C. over one hour under argon with agitation at 300 rpm. The reaction conditions were maintained for 90 minutes. The agitation was then stopped and the solids were allowed to settle for about 30 minutes at 100° C. The supernatant was then removed and the resulting solids were washed five times at 30° C. with 50 ml portions of methylene chloride and then twice at 30° C. with 50 ml portions of hexane and twice at ambient temperature with 50 ml portions of hexane prior to drying. The analysis showed that the catalyst component contained 11.4% Mg, 0.9% Ti and 15.3% Zr.

EXAMPLE 12

The procedure and ingredients of Example 8 were used except that 2.5 g (11 mmoles) $ZrCl_4$ was used instead of 5.2 g, 4.9 g of preactivated anhydrous $MgCl_2$ support was used instead of 5.6 g, the reaction conditions were maintained for 90 minutes rather than 3 hours, 50 ml portions of 1,2-dichloroethane were used to wash instead of 200 ml portions of anhydrous hexane and after the last wash at 60° C., but prior to the transfer to another reaction vessel for drying, the following procedure and ingredients were used.

The solids were then washed once with 50 ml hexane at 60° C. in the same manner as the other washes. Neat $TiCl_4$ (50 ml) was added to the resulting solids after this last wash and the reaction mixture was heated to 100° C. over one hour under argon with agitation at 300 rpm. The reaction conditions were maintained for 90 minutes. The agitation was then stopped and the solids were allowed to settle for approximately 20 minutes at 100° C. The supernatant was then removed and the resulting solids were washed three times at 60° C. with 50 ml portions of hexane and then three times at ambient temperature with 50 ml portions of hexane. The analysis showed that the catalyst component contained 12.4% Mg, 1.3% Ti and 15.5% Zr.

EXAMPLE 13

The procedure and ingredients of Example 8 were used except that no $ZrCl_4$ was used, 5.0 g of preactivated anhydrous $MgCl_2$ support was used instead of 5.6 g, the reaction conditions were maintained for 90 minutes rather than 3 hours, and then prior to washing the following procedure and ingredients were used.

A slurry of 1.0 g (4.3 mmoles) $ZrCl_4$ in 100 ml of 1,2-dichloroethane was added to the resulting solids and the reaction mixture was heated to 60° C. over one hour under argon with agitation at 300 rpm. The reaction conditions were maintained for 90 minutes. The agitation was then stopped and the solids were allowed to settle for approximately 20 minutes at 60° C. The supernatant was then removed and the resulting solids were washed five times at 60° C., three times at ambient temperature with 50 ml portions of 1,2-dichloroethane and twice at room temperature with 50 ml of hexane. The analysis showed that the catalyst component contained 13.0% Mg, 2.5% Ti and 9.2% Zr.

EXAMPLE 14

The procedure and ingredients of Example 8 were used except that no $ZrCl_4$ was used, 5.1 g of preactivated anhydrous $MgCl_2$ support was used instead of 5.6 g, the reaction conditions were maintained for 60 minutes rather than 3 hours, and then prior to washing the following procedure and ingredients were used.

A slurry of 1.0 g (4.3 mmoles) $ZrCl_4$ in 100 ml of 1,2-dichloroethane was added to the resulting solids and the reaction mixture was heated to 60° C. over 30 minutes under argon with agitation at 300 rpm. The reaction conditions were maintained for 60 minutes. The agitation was then stopped and the solids were allowed to settle for approximately 20 minutes at 60° C. The supernatant was then removed and the resulting solids were washed five times at 60° C., three times at room temperature with 50 ml portions of 1,2-dichloroethane and twice at ambient temperature with 50 ml of hexane. The analysis showed that the catalyst component contained 12.6% Mg, 3.2% Ti and 10.2% Zr.

EXAMPLE 15

The procedure and ingredients of Example 5 were used except that 5.0 g of preactivated $MgCl_2$ support containing 12.0% Mg and about 50% EtOH was used instead of 15.0 g $MgCl_2$ support containing 11.3% Mg and about 55% ethanol, 50 ml (0.45 moles) of $TiCl_4$ was used instead of 150 ml, and 1.2 ml (4.5 mmoles) of DIBP was used instead of 3.6 ml prior to the first solids separation and a mixture of 0.5 g (2.2 mmoles) $ZrCl_4$ and 0.7 g (2.2 mmoles) $HfCl_4$ in 100 ml of 1,2-dichloroethane were added to the resultant solids instead of the slurry of 3.0 g $ZrCl_4$ in 300 ml 1,2-dichloroethane and 50 ml wash volumes (instead of 100 ml) were employed. The analysis showed that the catalyst component contained 15.8% Mg, 1.3 Ti, 3.3% Hf, 4.2% Zr and 5.4% DIBP.

EXAMPLE 16

The procedure and ingredients of Example 8 were used except that no $ZrCl_4$ was used, 5.0 g of preactivated anhydrous $MgCl_2$ support was used instead of 5.6 g, 100 ml of $TiCl_4$ was used instead of 50 ml, the reaction conditions were maintained for 90 minutes rather than 3 hours, and then prior to washing the following procedure and ingredients were used.

A slurry of 1.0 g (4.3 mmoles) $ZrCl_4$ in 100 ml of 1,2-dichloroethane was added to the resulting solids and the reaction mixture was heated to 60° C. over 30 minutes under nitrogen with agitation at 250 rpm. The reaction conditions were maintained for 90 minutes. The agitation was then stopped and the solids were allowed to settle for approximately 20 minutes at 60° C. The supernatant was then removed and the solids were treated with $ZrCl_4$ again in exactly the same manner. The supernatant was then removed and the resulting solids were washed five times at 60° C., three times at ambient temperature with 50 ml portions of 1,2-dichloroethane and twice at room temperature with 50 ml hexane. The analysis showed that the catalyst component contained 12.3% Mg, 0.6% Ti and 16.4% Zr.

EXAMPLE 17

The procedure and ingredients of Example 1 were used except that 4.9 g of preactivated anhydrous $MgCl_2$ support was used instead of 5.1 g, 3.4 g (11 mmoles) $HfCl_4$ was used instead of $ZrCl_4$, 100 ml (0.90 mmoles) $TiCl_4$ was used instead of 50 ml throughout, and the first solids isolated were not washed prior to the second treatment and after the second treatment but prior to drying the solids were washed 5 times at 60° C. and 5 times at ambient temperature with hexane (instead of 3 times at each temperature). The catalyst component had 9.4% Mg, 2.2% Ti and 26.8% Hf on elemental analysis.

EXAMPLE 18

The procedure and ingredients of Example 1 were used except that 1.2 g (5.1 mmoles) $ZrCl_4$ was used instead of 2.5 g, the first solids were not washed and then the following procedure and ingredients were used.

A slurry of 1.7 g (5.3 mmoles) $HfCl_4$ in 50 ml of 1,2-dichloroethane was added to the resulting solids and the reaction mixture was heated to 60° C. over 30 minutes under nitrogen with agitation at 250 rpm. The reaction conditions were maintained for 90 minutes. The agitation was then stopped and the solids were allowed to settle for approximately 20 minutes at 60° C. The supernatent was then removed and the resulting solids were washed five times at 60° C. and three times at room temperature with 50 ml portions of 1,2-dichloroethane and then twice at room temperature with 50 ml portions of hexane. The supported catalyst component, while slurried in the final wash, was transferred into a Schlenk flask and dried in the customary manner. The catalyst component had 11.6% Mg, 1.2% Ti, 8.5% Zr, and 11.2% Hf on elemental analysis.

EXAMPLE 19

The procedure and ingredients of Example 8 were used except that a slurry of 2.5 g (11 mmoles) $ZrCl_4$ in 100 ml of 1,2-dichloroethane was used instead of 5.2 g $ZrCl_4$ and 50 ml neat $TiCl_4$ in the first treatment, 5.1 g of preactivated anhydrous $MgCl_2$ support was used instead of 5.6 g, the reaction mixture was heated to 60° C. over one hour rather than 100° and maintained at that temperature for 90 minutes rather than 3 hours, the solids were allowed to settle at 60° C. rather than 100° C., the supernatant was removed and the resulting solids washed five times at 60° C. with 50 ml portions of 1,2-dichloroethane and then two times at 60° C. with 50 ml portions of hexane, and after the last wash at 60° in Example 8, but prior to the room temperature washes and transfer to another reaction vessel for drying, the following procedure and ingredients were used.

The resulting solids were treated with 50 ml (0.45 mmoles) neat $TiCl_4$ and the reaction mixture was heated to 100° C. over one hour under low argon flow with agitation at 300 rpm. The reaction conditions were maintained for 90 minutes. The agitation was then stopped and the solids were allowed to settle for approximately 20 minutes at 100° C. The supernatant was then removed and the resulting solids were washed five times at 60° C., five times at ambient temperature with 50 ml portions of hexane. The analysis showed that the catalyst component contained 11.8% Mg, 3.4% Ti and 16.0% Zr.

POLYMERIZATION

The polymerizations with catalysts of Examples 1–7, 15 and 17 were conducted in a 1 gal. stirred batch reactor which had been purged for one hour with hot argon, cooled and then purged with gaseous propylene. Using standard Schlenk techniques, 0.01–0.03 g of solid catalyst component and 6.7 mmoles of the activator were premixed for 5 minutes under an inert atmosphere in 50–75 ml hexane and charged into the reactor. When an electron donor was used with the activator, it was premixed with the activator for 5 minutes prior to mixing with the solid catalyst component. The aluminum to electron donor ratio was varied from 20–80:1 when donor was used. Liquid propylene, 2.2 l, was then charged into the reactor. When employed, hydrogen was charged into the reactor in an amount necessary to reduce the molecular weight to the desired range, and the reactor was heated to 50–80° C. in five minutes. The temperature was maintained for 2 hours. The reactor was then vented and purged with argon. The polymer was removed and dried at 80° C. under vacuum for 2 hours. When necessary, the polymer was frozen in liquid nitrogen and then ground to an average particle size of about 1 mm prior to analysis. The relevant conditions, ingredients and analytical results are set forth in Table 1 below.

EXAMPLE 20

The catalyst component of Example 2 was used and the polymerization procedure for Examples 1–7, 15 and 17 was used except that 33 g (0.58 moles) 1-butene was added to the reactor after the liquid propylene was added but prior to heating to the reaction temperature employed. The resulting copolymer had a $T_m$ of 145° C. and a $\Delta H_f$ of 15 J/g both as determined by DSC, and about 2.6% butene by $^{13}C$ NMR.

EXAMPLE 21

The catalyst component of Example 2 was used and the polymerization procedure for Examples 1–7, 15 and 17 was used except that approximately 100 g ethylene was added incrementally, starting after heating of the contents to the reaction temperature employed, throughout the polymerization reaction. The resulting copolymer had no observed $T_m$ from 40 to 200° C. by DSC and about 15% ethylene by $^{13}C$ NMR.

EXAMPLE 22

The catalyst component of Example 2 was used with 10 mmoles TIBAL activator and the polymerization procedure for Examples 1–7, 15 and 17 was used except that 2.0 l isobutane was used as diluent instead of 2.2 l liquid propylene, the reaction temperature was maintained for 3 hours instead of 2 hours and ethylene was added starting before heating and continuously thereafter to maintain the pressure at approximately 300 psi.

The other relevant conditions, ingredients and analytical results for Examples 20–22 are set forth in Table I below.

TABLE I

| Example No. | Activator | Electron Donor | Al:Si[1] | Poly Temp (° C.) | H$_2$ (mole % of diluent) | Poly Mileage (kgPP/gCat) | % XSRT | IV (bulk) | IV of XSRT |
|---|---|---|---|---|---|---|---|---|---|
| 1 | TIBAL | — | — | 70 | — | 18 | 66 | 3.0 | 2.2 |
|  | TIBAL | — | — | 70 | 0.15 | 20 | 65 | 2.0 | 1.9 |
|  | TIBAL | — | — | 70 | 0.35 | 23 | 64 | 1.8 | 1.7 |
|  | TIBAL | — | — | 80 | — | 15 | 65 | 2.6 | 1.9 |
|  | TEAL | TB4MS | 20:1 | 70 | — | 3.1 | 36 | 5.8 | 3. |
| 2 | TIBAL | — | — | 70 | — | 32 | 80 | 2.6 | 2.4 |
|  | TEAL | DMMS | 20:1 | 70 | — | 15 | 62 | 3.7 | 3.2 |
|  | DIBAL-H | TB4MS | 20:1 | 70 | — | 13 | 68 | 3.6 | 2.7 |
|  | TIBAL | DMMS | 60:1 | 60 | — | 16 | 74 | 3.3 | 2.5 |
| 3 | TIBAL | — | — | 50 | — | 21 | 52 | 3.0 | 1.9 |
| 4 | TIBAL | — | — | 70 | — | 12 | 69 | 3.3 | 2.3 |
|  | TIBAL | DMMS | 60:1 | 70 | — | 7.7 | 65 | 4.0 | 3.2 |
| 5 | DIBAL-H | — | — | 70 | — | 13 | 53 | 3.7 | 2.0 |
|  | TEAL | DPMS | 20:1 | 70 | — | 6 | 26 | 5.3 | 3.0 |
|  | TEAL | TB4MS | 20:1 | 70 | — | 6 | 21 | 6.9 | 3.1 |
| 6 | TEAL | TB4MS | 20:1 | 70 | 0.35 | 15 | 7.2 | 2.6 | 1.4 |
|  | TEAL | DMMS | 20:1 | 70 | 0.35 | 16 | 23 | 2.3 | 1.7 |
| 7 | TEAL | TB4MS | 20:1 | 70 | 0.35 | 21 | 7.1 | 2.9 | 1. |
|  | TEAL | DMMS | 20:1 | 70 | 0.15 | 18 | 23 | 3.1 | 2.6 |
| 15 | TEAL | TB4MS | 60:1 | 70 | 0.35 | 10 | 21 | 3.0 | 1.5 |
|  | TEAL | TB4MS | 80:1 | 70 | 0.35 | 11 | 19 | 2.3 | 1.4 |
| 17 | TIBAL | — | — | 50 | — | 8 | 78 | 3.2 | 2.6 |
| 20 | TIBAL | — | — | 70 | — | 28 | 82 | 2.4 | 2.4 |
| 21 | TIBAL | — | — | 70 | — | 48 | 87 | 3.2 | 2.4 |
| 22 | TIBAL | — | — | 75 | 1.8 | 13 | — | 3.4 | — |

[1]Al: Silane mole ratio.

The polymers and copolymers produced with the catalyst of this invention in the absence of an electron donor in the solid catalyst component, except for polyethylene, are soft or rubbery polymers having 1) a room temperature xylene soluble fraction from about 50 to about 90%, 2) an intrinsic viscosity from greater than 1.0 to about 6.0 in the absence of a chain transfer agent, 3) a polymer melting point ($T_m$), when observed, of from 140° to 160° C., as determined by DSC, and 4) a crystallinity as measured by heat of fusion ($\Delta H_f$) which varies inversely and linearly with % XSRT and is typically from about 13 to about 28. The catalyst yield is from about 9,000 to about 60,000 g polymer/g catalyst in a 2 to 3 hour polymerization reaction.

The polyethylene produced with the catalyst of this invention exhibits an I.V. of about 20 or less depending on whether a chain transfer agent was employed, and when employed, on the amount of chain transfer agent used. Futher, the polyethylene produced with the catalyst of this invention exhibits a broad molecular weight distribution, typically broader than a polyethylene produced with a magnesium chloride supported titanium tetrachloride solid catalyst component/organoaluminum compound co-catalyst system.

The polymers and copolymers produced with the catalyst of this invention having an electron donor in the solid catalyst component 1) have a xylene soluble fraction from about 5 to 60%, 2) have an I.V. from 2 to 10 in the absence of a chain transfer agent, 3) exhibit a reduced heat of fusion, as measured by DSC, relative to highly isotactic polymers and 4) exhibit a ratio of the I.V. of the XSRT fraction to the I.V. of the whole polymer greater than or equal to 0.50. The crystallinity from heat of fusion ($\Delta H_f$), measured by DSC, is lower for the polymers of this invention produced with an electron donor-containing solid catalyst component (typically from 20 to 90 J/g) than for the isotactic polymers or copolymers produced using a solid catalyst component comprising a halogen-containing titanium compound and electron donor supported on an actived magnesium dihalide, especially magnesium dichloride, together a trialkyl aluminum activator and electron donor as cocatalyst (typically 100 J/g).

In general, the polymer and copolymers of this invention are of controlled tacticity, as evidenced by their xylene soluble fractions at room temperature, and exhibit a ratio of the I.V. of the XSRT fraction to the I.V. of the whole polymer of greater than or equal to 0.50. In addition, the propylene polymers with a high % XSRT typically exhibit a ratio of I.V. of the XSRT fraction to the I.V. of the whole polymer of greater than or equal to 0.70 and have improved elongation at break and tension set properties as compared to commercially available isotactic polymers. Further, the polymers of this invention have a higher I.V. than commercially available atactic polymers, which are waxy, solid, low molecular weight polymers having an I.V. of less than 0.5 and are generally used as an adhesive layer in multilayer structures.

The polymers of this invention are further characterized by an isotacticity of 45 to about 85% as determined by the number fraction of isotactic pentads from $^{13}$C NMR analysis, and a melting point of 140 to 160° C.

The polymers of this invention can be used in the manufacture of films, uniaxial and biaxial; fibers; injection and compression molded articles and extruded articles. They can also be used in fabric and extrusion coating applications and in hot melt adhesives.

The polymers of this invention may be compounded with one or more fillers, such as alumina trihydrate, talc, calcium carbonate, wollastonite ($CaSiO_3$), mica, metallic flakes, glass flakes, milled glass, glass spheres, glass fibers, carbon fibers, metal fibers and aramid fibers. When fillers are present, they are typically present in an amount totalling about from 1 to 40 percent by weight of the polymer material.

Conventional additives, such as stabilizers and pigments, also may be present. Antioxidant-type stabilizers can be present in an amount of about from 0.05 to 1.0 pph (parts per hundred), based on the weight of polymer material. Antacids, if used, are typically present in an amount of about from 0.05 to 0.5 pph, preferably about from 0.05 to 0.2 pph, based on polymer material weight. Heat stabilizers can be used in an amount of about from 0.05 to 1 pph, based on polymer material weight. Pigments can be used in an amount of about from 0.2 to 5, preferably about from 2 to 3, pph, based on polymer material weight.

Typical antioxidants include hindered phenolic compounds, such as tetrakis[methylene(3,5-ditertiary-butyl-4-hydroxyhydrocinnamate)] methane. Suitable antacids include alkali and alkaline earth metal stearates, such as sodium stearate and calcium stearate. Thioesters, such as trilauryl trithiophosphate (TLTTP) and distearyl thiodipropionate (DSTDP) are typical heat stabilizers. Suitable pigments include carbon black and titanium dioxide.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A product produced by the polymerization of at least one alpha-olefin of the formula $CH_2$=CHR where R is a $C_{1-12}$ branched or straight chain alkyl or unsubstituted or substituted cycloalkyl comprising a polymer having 1) a room temperature xylene soluble fraction from about 50 to about 90%, 2) an intrinsic viscosity greater than 1.0 to about 6.0 in the absence of a chain transfer agent, 3) a polymer melting point ($T_m$), when observed, of from 140° to 160° C., as determined by DSC, and 4) a crystallinity as measured by heat of fusion ($\Delta H_f$) which varies inversely and linearly with XSRT and is from about 13 to about 28 wherein the product is produced with a catalyst comprising (a) an organometallic compound as activator, optionally, with an electron donor and (b) a solid catalyst component consisting essentially of an activated anhydrous $MgCl_2$/alcohol adduct solid support which has been first treated in the absence of an electron donor with at least one treatment of a combination of at least two halogen-containing transition metal compounds, wherein one is a halogen-containing titanium metal compound and one is a halogen-containing non-titanium transition metal compound wherein the transition metal is Hf, Zr or Sc, with the solids being isolated in between treatments.

2. An olefin polymer material produced by the polymerization of at least one alpha-olefin of the formula $CH_2$=CHR where R is a $C_{1-12}$ branched or straight chain alkyl or unsubstituted or substituted cycloalkyl comprising a polymer having 1) a xylene soluble fraction from about 5 to 60%, 2) an I.V. from about 2 to 10 in the absence of a chain transfer agent, 3) a reduction in heat of fusion, as measured by DSC, relative to highly isotactic olefin polymers and 4) a ratio of the I.V. of the XSRT fraction to the I.V. of the whole polymer which is greater than or equal to 0.50.

* * * * *